(12) United States Patent
Marquez (10) Patent No.: US 9,840,205 B1
(45) Date of Patent: Dec. 12, 2017

(54) ROTATABLE RACK FOR VEHICLE BED

(71) Applicant: Osvaldo Marquez, Rifle, CO (US)

(72) Inventor: Osvaldo Marquez, Rifle, CO (US)

( * ) Notice: Subject to any disclaimer, the term of this patent is extended or adjusted under 35 U.S.C. 154(b) by 0 days.

(21) Appl. No.: 14/794,717

(22) Filed: Jul. 8, 2015

(51) Int. Cl.
*B60R 9/02* (2006.01)
*B60R 9/06* (2006.01)
*B60R 11/00* (2006.01)

(52) U.S. Cl.
CPC ........ *B60R 9/02* (2013.01); *B60R 9/06* (2013.01); *B60R 2011/004* (2013.01); *B60R 2011/008* (2013.01); *B60R 2011/0052* (2013.01); *B60R 2011/0059* (2013.01); *B60R 2011/0085* (2013.01)

(58) Field of Classification Search
CPC .. B60R 9/00; B60R 9/06; B60R 9/065; B60R 11/06; B60R 2011/004; B60R 2011/0085; B60R 9/02
USPC .... 224/403, 404, 405, 282, 310, 913; 296/3, 296/37.6; 414/462
See application file for complete search history.

(56) References Cited

U.S. PATENT DOCUMENTS

| | | | | |
|---|---|---|---|---|
| 2,781,897 | A * | 2/1957 | Dale | F41C 33/06 206/317 |
| 4,116,373 | A * | 9/1978 | Bryngelson | B62D 43/02 224/403 |
| 4,212,417 | A * | 7/1980 | Scott | B62D 43/08 224/403 |
| 4,957,229 | A * | 9/1990 | Freeman | B60R 7/14 124/23.1 |
| 5,209,628 | A | 5/1993 | Hassell | |
| 5,255,951 | A * | 10/1993 | Moore, III | B60R 9/02 224/405 |
| D345,273 | S * | 3/1994 | Horn | D6/552 |
| 5,299,722 | A * | 4/1994 | Cheney | B60R 7/14 206/317 |
| 5,398,778 | A | 3/1995 | Sexton | |
| 5,421,495 | A | 6/1995 | Bubik et al. | |
| 5,752,636 | A * | 5/1998 | Manley | B60R 9/06 224/403 |
| 5,884,824 | A * | 3/1999 | Spring, Jr. | B60R 9/042 224/309 |
| 5,979,102 | A | 11/1999 | Sagryn | |
| 6,145,718 | A * | 11/2000 | Edwards | B60R 7/14 224/401 |
| 6,206,261 | B1 * | 3/2001 | McCrary | B60R 7/14 206/315.11 |
| 6,588,720 | B1 | 7/2003 | Revette | |
| 6,854,627 | B2 | 2/2005 | Foo et al. | |
| 7,066,366 | B2 * | 6/2006 | Hancock | B60R 7/14 224/401 |
| 7,128,355 | B1 | 10/2006 | Anderson et al. | |

(Continued)

*Primary Examiner* — Justin Larson
(74) *Attorney, Agent, or Firm* — Peacock Myers, P.C.; Janeen Vilven; Justin Jackson (57) ABSTRACT

A rotatable rack for a vehicle bed. The rack can be clamped onto a bed of a vehicle and an item, which can optionally include a case or a tool box, can be rotated into and out of the bed of the truck. The rack can be locked into one or more positions via a pin engaging one or more openings. The rack can hold the item inside of the bed of the vehicle suspended above the bed such that the item does not get slammed up and down as violently when traveling down a rough road as it would if it were merely placed on the bottom of the bed of the vehicle.

21 Claims, 13 Drawing Sheets

(56) References Cited

U.S. PATENT DOCUMENTS

| | | | |
|---|---|---|---|
| 7,341,418 B2* | 3/2008 | Ito | B60P 3/1016 414/466 |
| 7,780,050 B2 | 8/2010 | Tucker | |
| 8,033,777 B2 | 10/2011 | Janecek | |
| 8,393,665 B2* | 3/2013 | Villano | B60R 9/065 224/403 |
| 8,636,182 B1* | 1/2014 | Gordon | B60P 3/14 224/282 |
| 8,833,621 B2* | 9/2014 | Burkhardt | B60P 3/40 224/403 |
| 2001/0036395 A1* | 11/2001 | Talbott | B60P 1/4407 414/462 |
| 2003/0094471 A1* | 5/2003 | McNalley | B60R 7/14 224/403 |
| 2007/0096486 A1* | 5/2007 | Niedziela | B60P 3/40 296/3 |
| 2007/0170217 A1* | 7/2007 | Lemoine | B60P 3/002 224/405 |
| 2007/1152003 | 7/2007 | Dollar, Jr. | |
| 2009/1120976 | 5/2009 | Mackarvich | |
| 2009/0255966 A1* | 10/2009 | Prapavat | B60R 9/00 224/403 |
| 2013/0093203 A1* | 4/2013 | Burkhardt | B60P 3/40 296/3 |
| 2014/0054339 A1* | 2/2014 | Smith | B60R 9/06 224/404 |
| 2014/0305979 A1* | 10/2014 | Marr, Jr. | B60R 9/00 224/405 |
| 2014/0346206 A1* | 11/2014 | McKnight | A01K 97/08 224/404 |
| 2015/0086312 A1* | 3/2015 | Ohnesorge | B60R 11/06 414/462 |

* cited by examiner

ROTATABLE RACK FOR VEHICLE BED

BACKGROUND OF THE INVENTION

Field of the Invention (Technical Field)

Embodiments of the present invention relate to a rotatable rack. More particularly, embodiments of the present invention relate to a rotatable rack which can be mounted on the side of a truck bed and to which tools, equipment, and other items, including but not limited to gun cases, can be attached and made to pivot from inside of the truck bed to an area outside of the truck bed.

Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

Although vehicle beds provide a large and convenient space in which to transport cargo, such beds often subject cargo to a rather rough ride. This is partly because of the stiff suspension of trucks that is provided in order to accommodate heavy loads and it is partly because the bed of the vehicle is not used for transporting people.

Often, persons transport valuable and/or fragile cargo in the bed of a truck. This is because such cargo cannot fit into the cab of a truck or it is because the driver prefers that it be separated physically from them. In such instances, the driver must then attempt to drive very carefully and smoothly or must provide some shock-absorbing packaging for the cargo. Of course, it is often not possible to drive smoothly (i.e. when the road surface is rough) and shock absorbing packaging takes up space, typically provides a very minimal amount of shock absorption, and does not secure the cargo. Thus, even with shock-absorbing packaging, the user must still strap the cargo to prevent it from sliding around on the bed of the vehicle.

There is thus a present need for a method and apparatus which provides an expedient and effective mechanism for not only providing significant shock-absorption for cargo, but which also prevents the cargo from sliding about in the bed of the truck.

BRIEF SUMMARY OF EMBODIMENTS OF THE PRESENT INVENTION

An embodiment of the present invention relates to a rack having one or more vehicle bed clamps, a cross member, a plurality of arms; the arms disposed at opposing end portions of the cross member, a hinge connecting each of the arms to the cross member, and at least one tab disposed proximal to at least one of said arms; said tab comprising a pin-receiving opening. In one embodiment, the at least one tab includes two tabs, and each of the two tabs has at least one pin-receiving opening. The at least one tab can be disposed near each of the arms. A pin, positionable to engage the pin-receiving portion of the at least one tab can also be provided. At least one of the arms can include a pin-opening disposed therethrough.

In one embodiment, the arms can have a bend in them. The one or more vehicle bed clamps can have c-shape, for example, a shape similar to a conventional C-clamp. The one or more vehicle bed clamps can have a threaded portion which secures the rack to the vehicle bed upon rotation of the threaded portion. Optionally one or more tubes can be provided which can be disposed over at least part of said threaded portion. The rack can include an item attached to the arms, which can optionally include a case, including but not limited to a gun case, and/or a tool box.

Optionally, a pivoting member can be connected to the arms. And, an item can be connected to the pivoting member, such that it is pivotable with respect to the arms.

An embodiment of the present invention also relates to a rack having a pair of vehicle bed clamps, a cross member extending between the pair of vehicle bed clamps, a first arm hingedly connected to a first end portion of the cross member, a second arm hingedly connected to a second end portion of the cross member, and at least one tab disposed proximal to at least one of the arms, the tab comprising a pin-receiving opening.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 7, 8, 9, and 10 are drawings which illustrate a rack according to an embodiment of the present invention with a case attached thereto which is attached to the side of a vehicle and which illustrates the case at various positions which the rack is capable of retaining the case at;

DETAILED DESCRIPTION OF THE INVENTION

An embodiment of the present invention is directed to a pivoting rack that mounts to the side of vehicle bed, including but not limited to the sides of pickup truck beds. The rack preferably provides significant shock absorption and provides the user the ability to simply and expeditiously load and unload the cargo from into and out of the truck bed.

Figure 9:
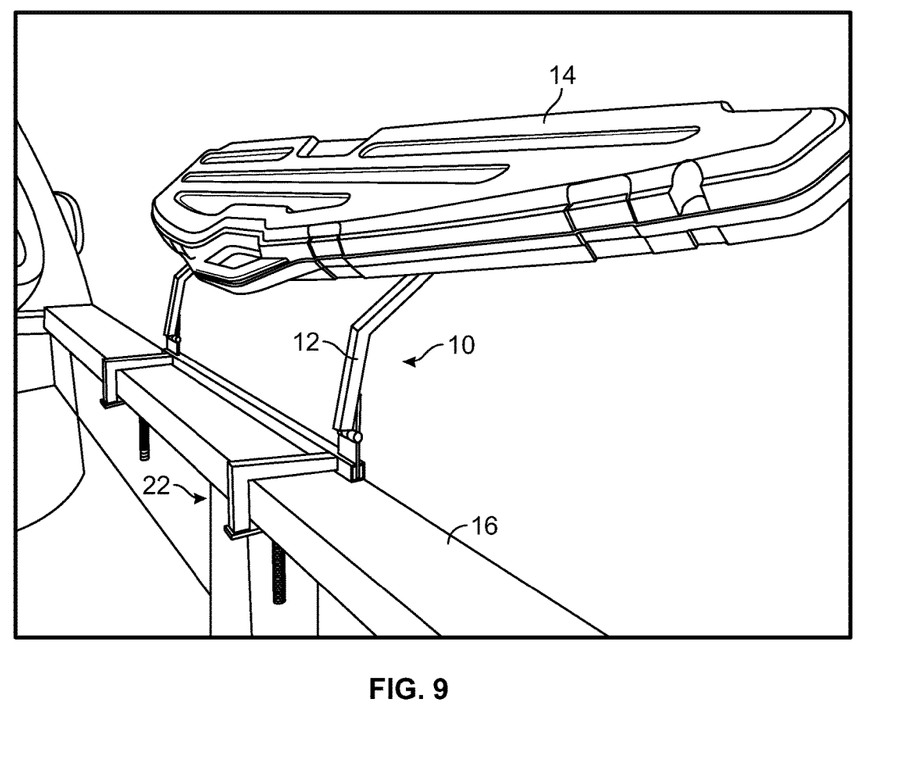
Figure 10:
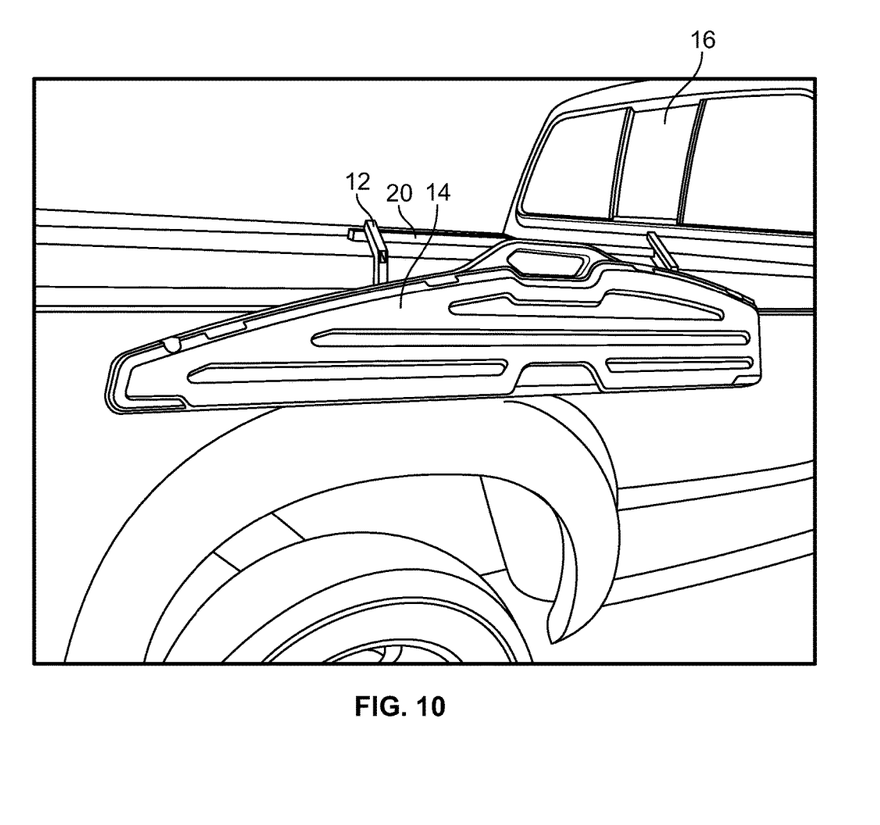
Figure 11:
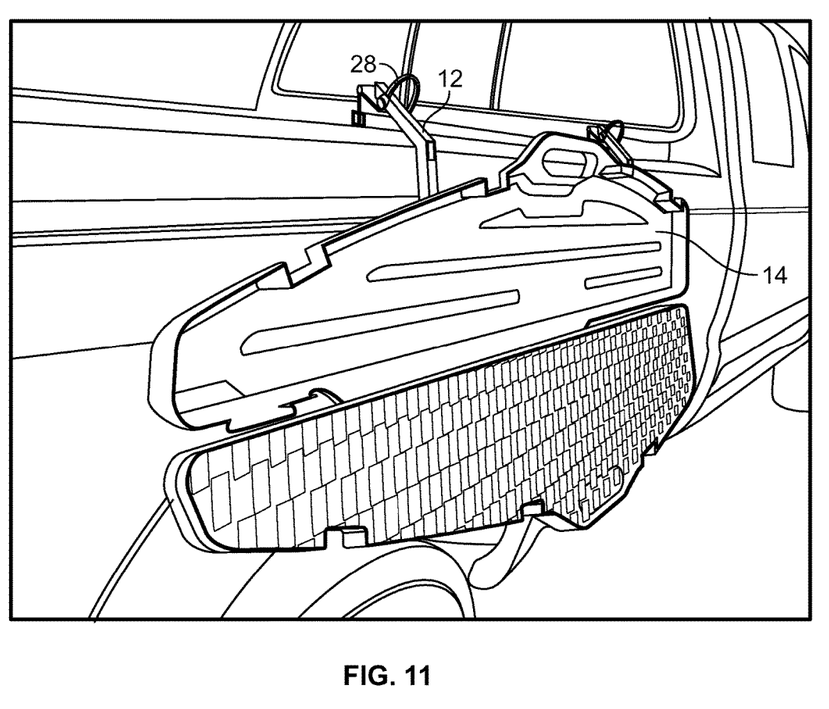
FIG. 11 is a drawing which illustrates a case disposed on a rack according to an embodiment of the present invention which is mounted on the side of a vehicle and wherein the case is in an open position.

Referring now to the figures, rack 10 preferably includes a plurality of arms 12. Rack 10 can pivot such that attached item 14 (see FIG. 9) is attached to arms 12 of rack 10 can be moved from the outside of vehicle 16 (see FIG. 9) to the inside of vehicle 16 and such that, if desired, item 14 can be suspended above the bed of vehicle 16. Because arms 12 of rack 10 can optionally comprise a material having desirable stress-strain characteristics, such as elastic properties, the rack's positioning of item 14 above the bed of vehicle 16 thus promotes a reduction in shock-forces that would otherwise be encountered by item 14. In one embodiment, item 14 can comprise any item which is desired to be transported, including but not limited to cases, containers, equipment, tools, combinations thereof, and the like.

Figure 12:
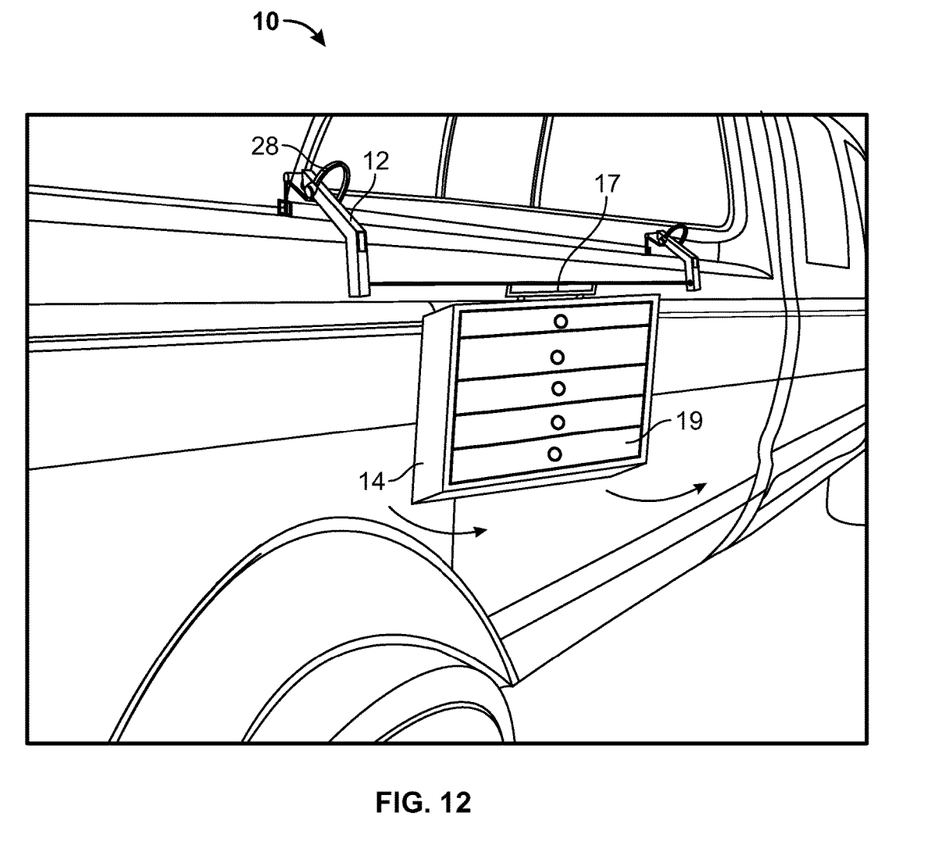
FIG. 12 is a drawing which illustrates a toolbox hingedly connected to a rack according to an embodiment of the present invention.

By not bouncing around in the bed of a vehicle, more fragile items can thus be transported in the back of a vehicle. As best illustrated in FIG. 12, in one embodiment, item 14 can optionally be connected to swinging bracket 17 or another pivot point which can itself be attached to one or more of arms 12 such that item 14 can pivot with respect to rack 10, thus permitting item 14 to remain in an upright position when rack 10 is rotated from inside of a bed of a vehicle to outside of the bed of the vehicle. As further illustrated therein, in one embodiment, item 14 can comprise a tool box or cabinet, which can optionally contain one or more compartments or drawers 19.

Figure 1:
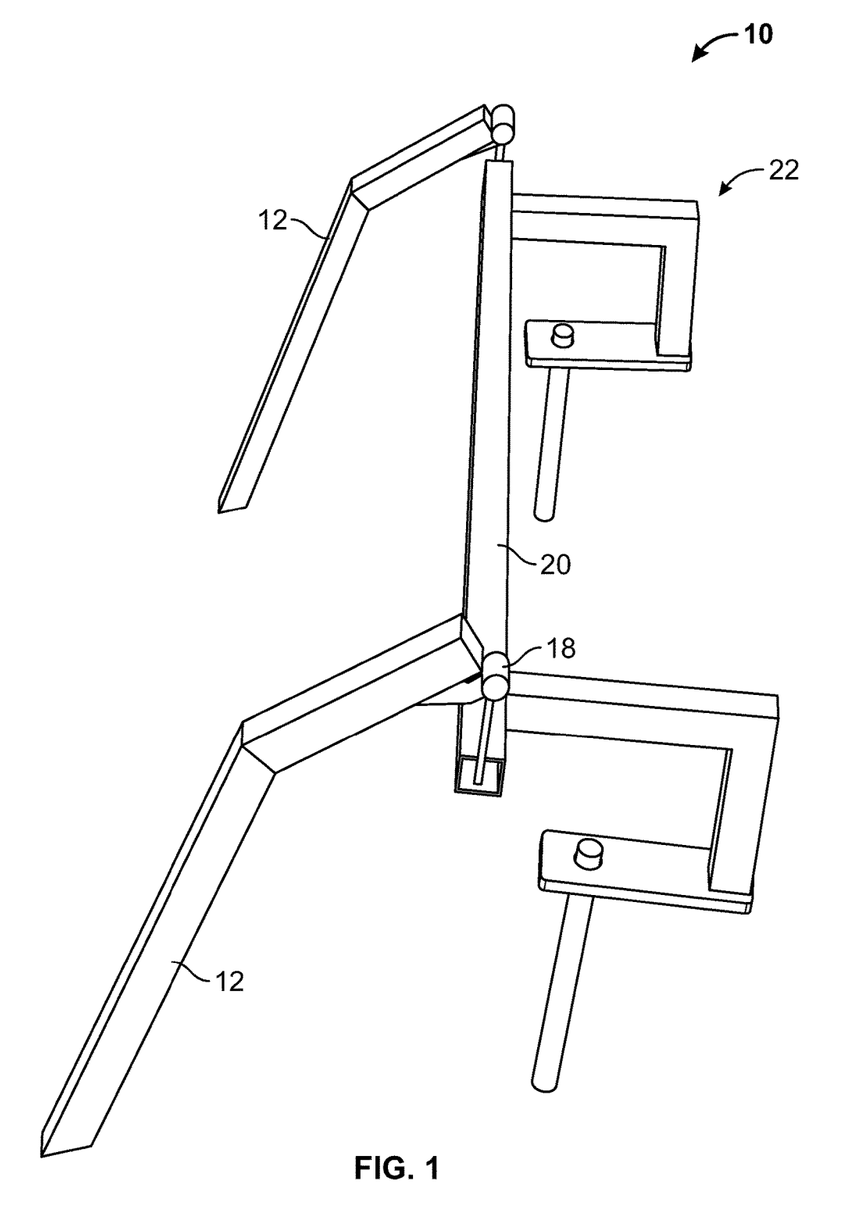
FIGS. 1 and 2 are drawings which respectively illustrate an elevated perspective view and a top view of a mounting rack of the present invention.
Figure 2:
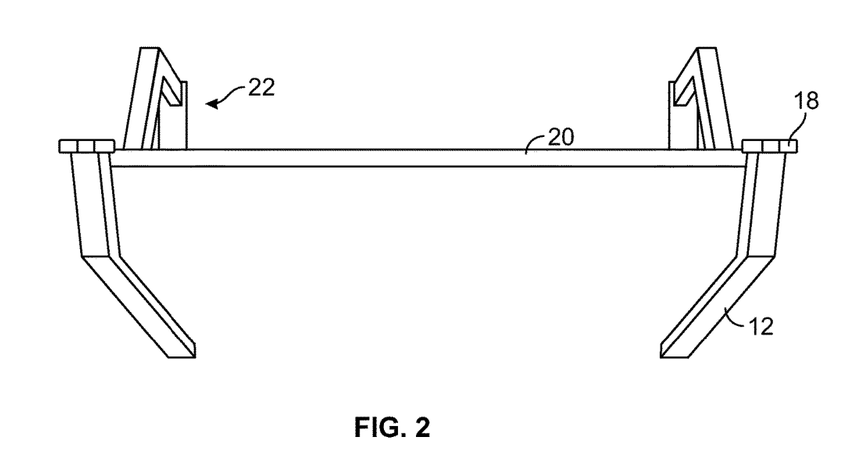
Figure 3A:
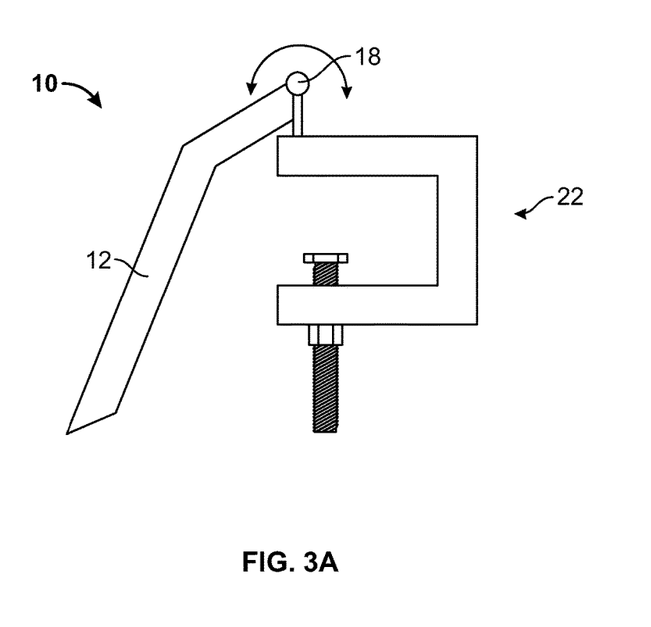
FIGS. 3A and 3B are drawings that illustrate embodiments of pivot mechanisms of the mounting rack of the present invention.
Figure 3B:
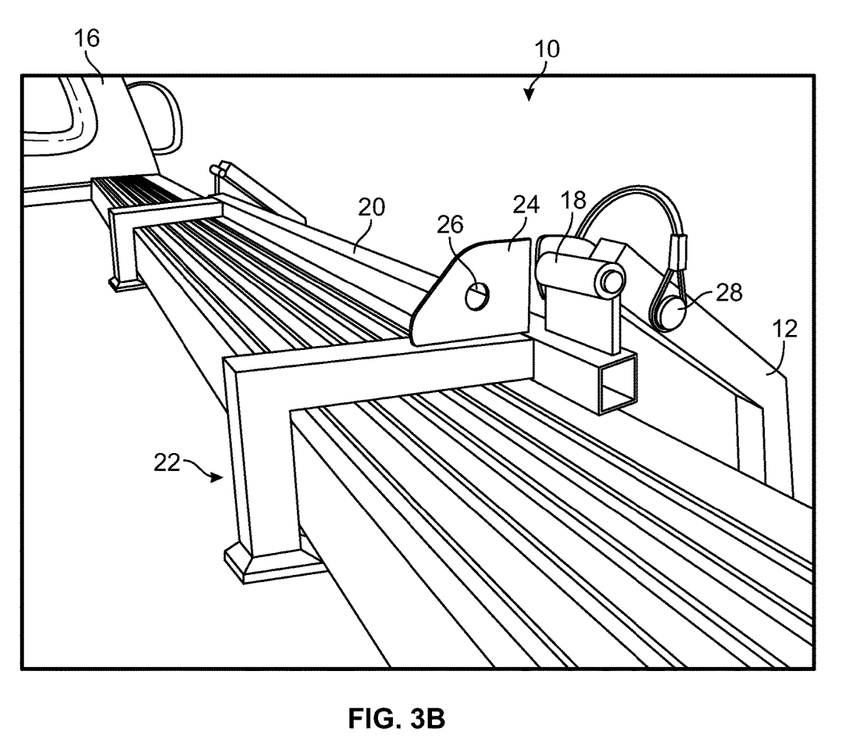
Figure 4:
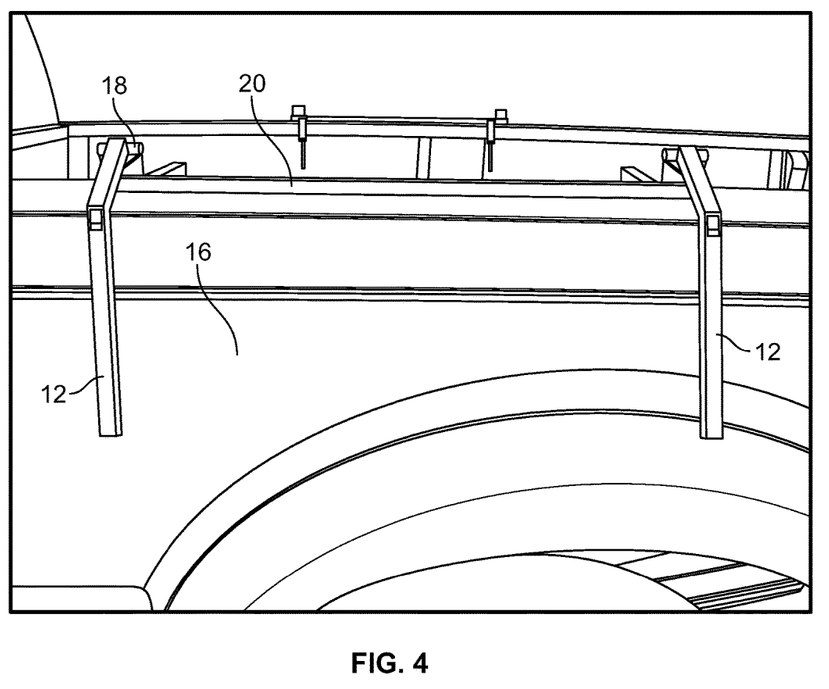
FIGS. 4, 5, and 6 are drawings which illustrate front and perspective side views of an embodiment of a mounting rack of the present attached to the side of a vehicle.
Figure 5:
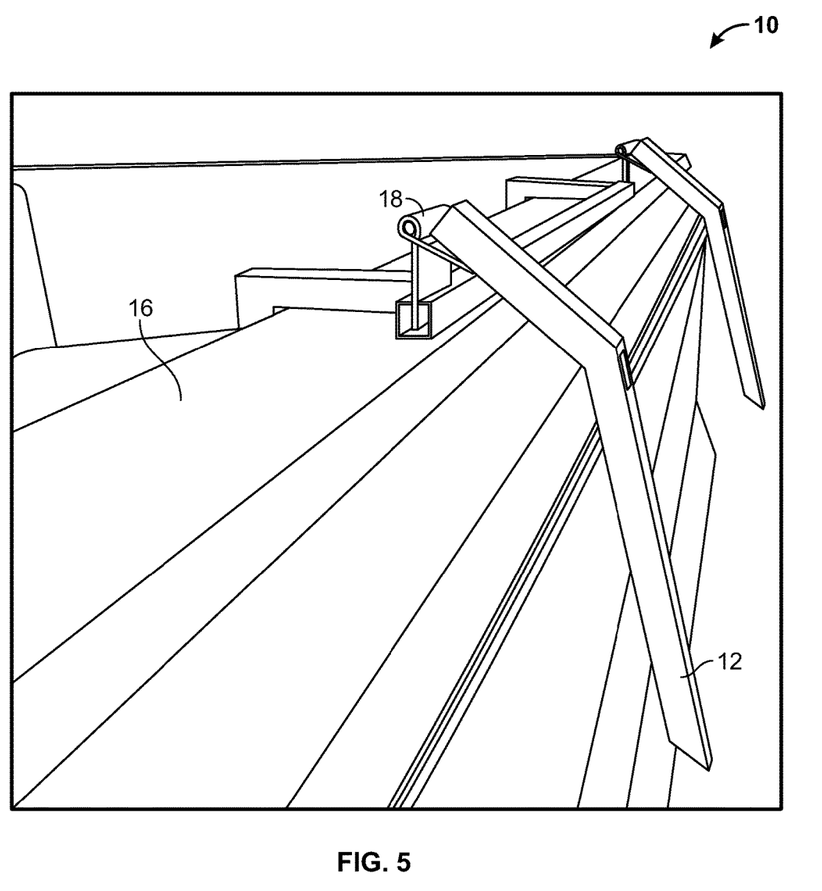
Figure 6:
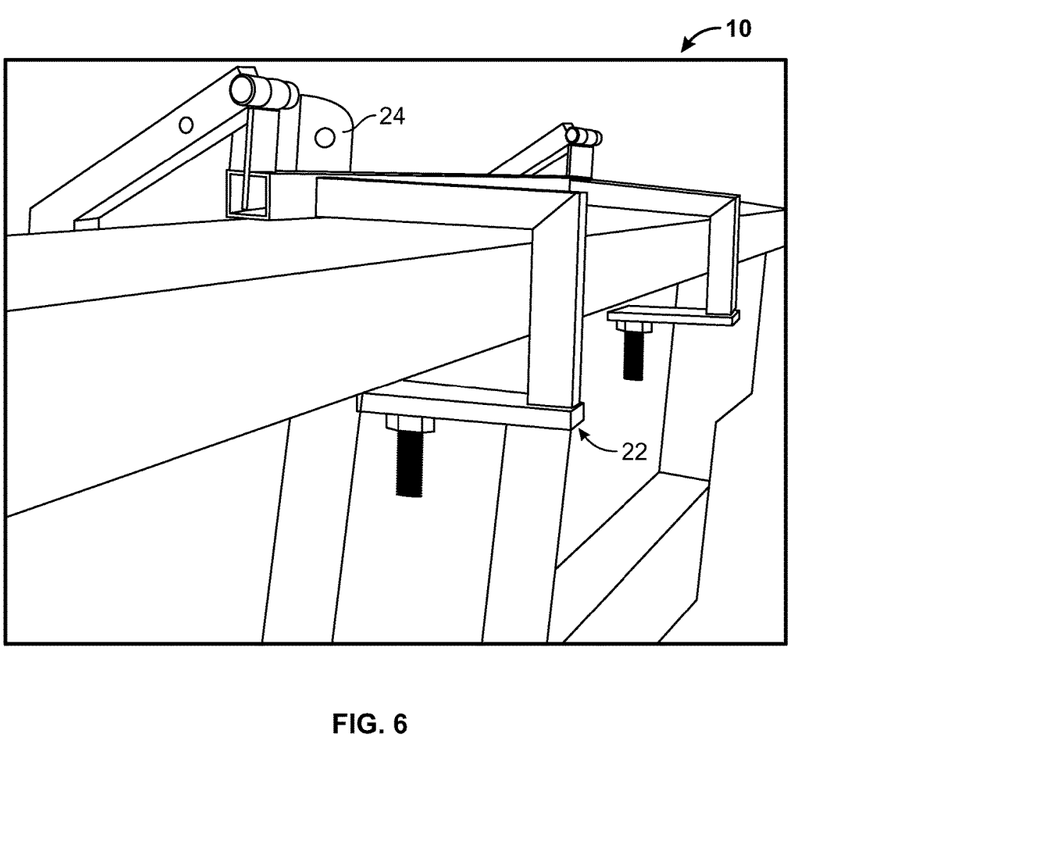
Figure 7:
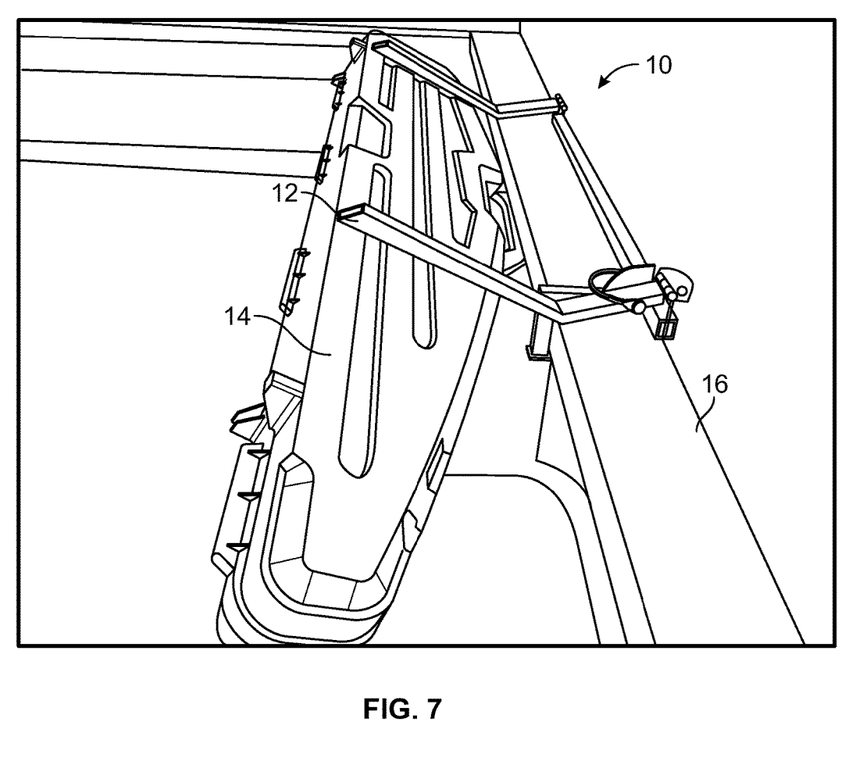
Figure 8:
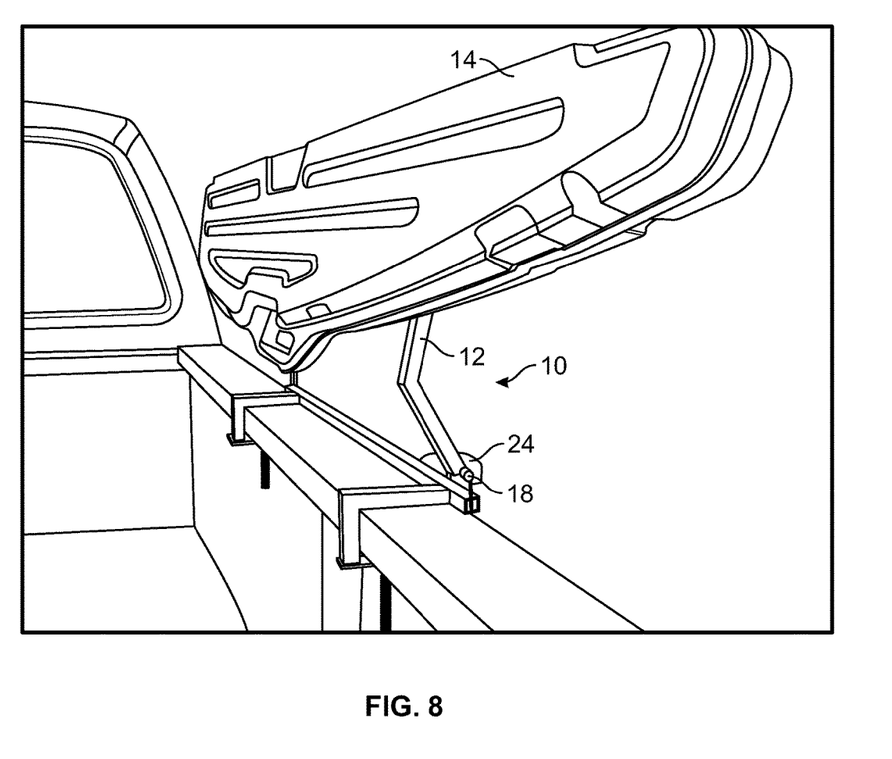

Rack 10 preferably comprises hinges 18 which enable arms 12 to rotate with respect to cross-member 20. Cross-member 20 is preferably rigidly connected to clamps 22, which are most preferably spaced apart and are disposed at or near the proximal and distal end portions of cross-members 20. In one embodiment, as best illustrated in FIGS. 3B and 6, one or more tabs are preferably attached to one or more of clamps 22 and/or cross member 20. Tabs are preferably positioned near one or both of arms 12 and 24 and most preferably comprise one or more openings 26. In this embodiment, pin 28 is preferably disposed through a lower portion of one or more of arms 12 and pin 28 can also be passed through opening 26 in tab 24. In this embodiment, when pin 28 is passed through arm 12 and opening 26, arm 12 is preferably held in a fixed position and is thus no longer free to rotate about hinge 18. In one embodiment, a pair of tabs can be disposed back-to-back so that an opening of one of tabs 24 permits arm 12 to be held in a first position, whereas positioning pin 28 in the other tab causes arm 12 to be held in a second position. In one embodiment, a pair of tabs can be disposed back-to-back but can be spaced a slight distance apart such that a first opening for pin 28 is provided in a first tab, a second opening for pin 28 is provided in a second tab and a third opening for pin 28 is formed by the gap between the two tabs. This embodiment, thus provides three different locking positions for arm 12.

Although clamps 22 can be constructed so as to form any structure capable of attaching rack 10 to a vehicle, in one embodiment, clamps 22 most preferably comprise a shape similar to that of a C-clamp, such that a user can simply side the clamps over a side of a truck bed and then the user need only screw a threaded member of the clamp to secure it to the vehicle.

In one embodiment, rack 10 preferably comprises two arms 12, each of which are preferably connected at their proximal end to cross-member 20 via hinge 18 and a proximal end-portion of arms 12 are preferably each connected to an item which can optionally comprise a case and which can optionally comprise a tool box or a gun case. In one embodiment, item 14 is rotationally-connected to one or more arms 12. In an alternative embodiment, item 14 is non-rotationally connected to one or more of arms 12. In one embodiment, only one of arms 12 is securable to tabs 24 via pin 28. In an alternative embodiment, a plurality of arms 12 are securable to tabs 24 via pins 28.

In one embodiment arms 12 preferably comprise a bend in them which permits the arms to be oriented such that they are in a predetermined desired orientation, for example substantially vertical, when rotated to the fully out and down position on the side of the vehicle. In one embodiment, the bend in the arms can be formed such that it is an angularly-adjustable component. In one embodiment, the bend in arms 12 can be a lockable angularly-adjustable component.

In one embodiment, cross member 20 comprises a pipe or tube which has a length that is at least five times greater than its width and its height. In one embodiment, clamps 22 comprise a C-shape and are configured such that they can be slid from inside of a truck bed toward the outside of the truck bed, thereby causing their bottom portion to be placed under the lip of a top rail of a side of a truck bed and such that when a threaded rod is rotated on the bottom of the clamp, it travels upward and thereby presses upward against the bottom of the top rail of the side of the truck bed, thereby causing the top rail to be clamped between an end portion of the threaded rod (or something connected to the end of the threaded rod) and the bottom side of an upper member of the clamp.

In one embodiment, no holes need to be drilled into any portion of a vehicle in order to properly install rack 10 to the vehicle. In one embodiment, no permanent modifications, such as welding, are required in order to properly install rack 10 to the vehicle.

In one embodiment, item 14 is rigidly secured to arms 12 and thus does not rotate with respect to arms 12 when arms 12 are rotated to move the item from inside of a vehicle bed to a location outside of the vehicle bed. Thus, in one embodiment, the orientation of the item with respect to the ground becomes inverted when moved from inside of the truck bed to an outside of the truck bed and/or vice-versa. In one embodiment, aside from cross member 20 and item 14, no other portions of rack 10 span a distance between arms 12 (i.e. no end rail or other structure is provided to join or other wise span between arms 12). In one embodiment, when rack 10 is installed in its intended operating position on a vehicle, hinges 18 extend above a top portion of a top rail of a side of the vehicle bed. In one embodiment, when installed in its intended operating position, cross member 20 preferably rests above a top of a top rail of a side of the vehicle bed.

Figure 13:
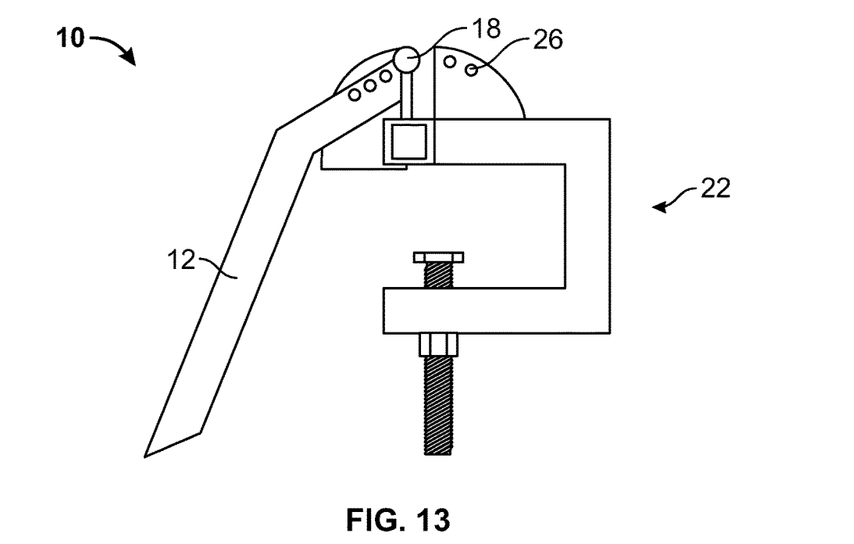
FIG. 13 is a drawing which illustrates an embodiment of the present invention wherein a plurality of holes are provided for a multiple adjustment positions.
Figure 14:
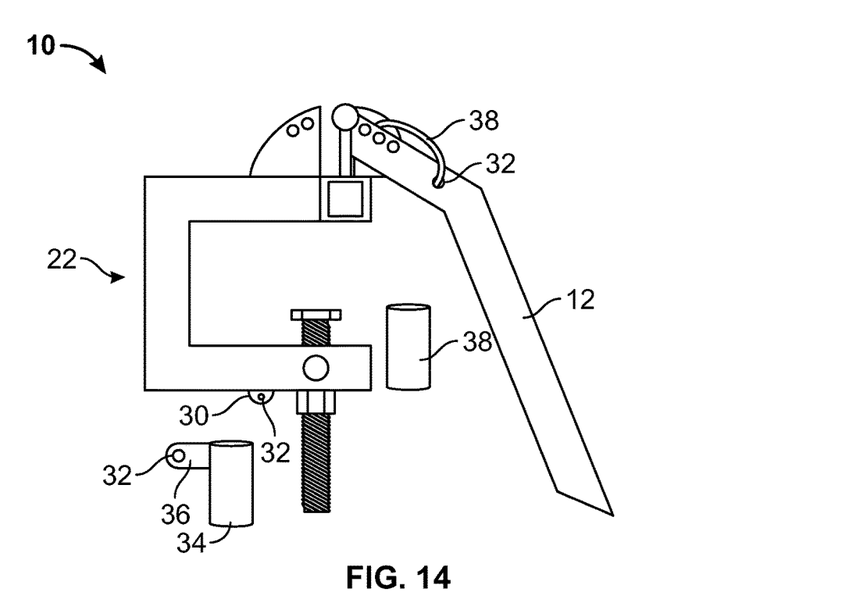
FIG. 14 is a drawing which illustrates an embodiment of the present invention wherein a security mechanism is provided which inhibits theft of the apparatus.

As best illustrated in FIG. 13, a plurality of holes 26 can be provided such that arms 12 comprise multiple adjustment positions. As best illustrated in FIG. 14, in one embodiment, rack 10 can comprise a security feature. Which can optionally include tab 30 secured or otherwise formed onto a lower portion of clamp 22 which can include hole 32 which can be aligned with a respective hole 32 in tab 36, which itself can be secured or otherwise formed onto tube 34. In this embodiment, a user preferably slides tube 34 up over a lower end of a threaded member of clamp 22 so that it is covered, thus inhibiting the ability for someone to use pliers or another object to turn the threaded member and thus remove rack 10. Once tube 34 is in place, a user preferably aligns holes 32 with one another and secures them together by passing a lock (for example a pad or combination lock) through holes 32. In a further embodiment, a user can optionally remove the threaded member of clamp 22 and slide tube 38 up over it and then place the threaded member back into clamp 22. Thus, the portion of the threaded member which extends up from clamp 22 is protected by tube 38. The lower end of the threaded portion can then be covered with tube 34.

In one embodiment, when item 14 is inside of a bed of the vehicle, no portion of the vehicle contacts item 14 and no portion of the vehicle contacts an end portion of any of arms 12 which is near the point of contact for item 14. Thus, in one embodiment, when item 14 is inside of a bed of the vehicle, arms 12 do not contact the bottom of the bed of the vehicle.

Optionally, a hole can be disposed in one or a plurality of arms 12 near the pivot point of the rack such that a pin or other fastener can be disposed, thereby locking the rack into a particular position. The rack can be removably-positionable with respect to the side of the vehicle via a clamping mechanism.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A rack comprising:
   one or more vehicle bed clamps, said vehicle bed clamps each comprising a threaded rod that is rotatable, said vehicle bed clamp also comprising a shape such that when said vehicle bed clamp is positioned on a vehicle in its intended operating position and when said threaded rod is rotated, a top rail of a side of a vehicle bed is clamped between an end of said threaded rod and a member of said vehicle bed clamp;
   a cross member;
   a plurality of arms; said arms disposed at opposing end portions of said cross member;
   a hinge connecting each of said arms to said cross member; and
   at least one tab disposed proximal to at least one of said arms; said tab comprising a pin-receiving opening; and
   wherein an end portion of each of said plurality of arms is positionable into and out of the vehicle bed.

2. The rack of claim 1 wherein said at least one tab comprises two tabs, and wherein each of said two tabs comprises at least one pin-receiving opening.

3. The rack of claim 1 wherein said at least one tab is disposed proximal to each of said arms.

4. The rack of claim 1 further comprising a pin positionable to engage said pin-receiving portion of said at least one tab.

5. The rack of claim 4 wherein at least one of said arms comprises a pin-opening disposed there through.

6. The rack of claim 1 wherein said plurality of arms comprise a bend.

7. The rack of claim 1 wherein when one of said vehicle bed clamps is positioned with said threaded rod on a bottom portion of said vehicle bed clamp and said threaded rod is rotated, it travels upward.

8. The rack of claim 1 wherein one or more of said vehicle bed clamps comprises an item attached to said end of said threaded rod such that both said item and the top rail of the side of the vehicle bed are clamped between said end of said threaded rod and said member of said vehicle bed clamp.

9. The rack of claim 8 further comprising one or more tubes disposable over at least part of said threaded rod.

10. The rack of claim 1 further comprising an item attached to said arms.

11. The rack of claim 10 wherein said item attached to said arms comprises a case.

12. The rack of claim 11 wherein said case comprises a gun case.

13. The rack of claim 10 wherein said item attached to said arms comprises a tool box.

14. The rack of claim 1 further comprising a pivoting member connected to said arms.

15. The rack of claim 14 further comprising an item connected to said pivoting member, wherein said item connected to said pivoting member is connected such that it is pivotable with respect to said arms.

16. A rack comprising:
   a pair of vehicle bed clamps, said vehicle bed clamps each comprising a threaded rod that is rotatable, said vehicle bed clamp also comprising a shape such that when said vehicle bed clamp is positioned on a vehicle in its intended operating position and when said threaded rod is rotated, at least a top rail of a side of a vehicle bed is clamped between an end of said threaded rod and a member of said vehicle bed clamp;
   a cross member extending between said pair of vehicle bed clamps;
   a first arm hingedly connected to a first end portion of said cross member;
   a second arm hingedly connected to a second end portion of said cross member; and
   at least one tab disposed proximal to at least one of said arms, said tab comprising a pin-receiving opening; and
   wherein an end portion of each of said plurality of arms is positionable into and out of the vehicle bed.

17. The rack of claim 16 further comprising an item connected to said arms.

18. The rack of claim 17 wherein said item comprises a case.

19. The rack of claim 16 wherein when one of said vehicle bed clamps is positioned with said threaded rod on a bottom portion of the clamp and said threaded rod is rotated, it travels upward.

20. The rack of claim 16 wherein said at least one tab comprises two tabs, and wherein each of said two tabs comprises at least one pin-receiving opening.

21. The rack of claim 16 further comprising a rotational member disposed between said first and said second arms.

\* \* \* \* \*